United States Patent [19]
Scully

[11] 3,764,052
[45] Oct. 9, 1973

[54] PRESSURE ROLL ASSEMBLY FOR TAPE RECORDING AND PLAYBACK EQUIPMENT

[75] Inventor: Lawrence J. Scully, Bridgeport, Conn.

[73] Assignee: Dictaphone Corporation, Rye, N.Y.

[22] Filed: Mar. 14, 1972

[21] Appl. No.: 234,568

[52] U.S. Cl. .................................. 226/176, 226/181
[51] Int. Cl. .................................. B65h 17/22
[58] Field of Search .................... 226/176, 177, 181, 226/186, 187

[56] References Cited

UNITED STATES PATENTS

| | | | |
|---|---|---|---|
| 3,142,429 | 7/1964 | Zivny | 226/187 |
| 3,257,056 | 6/1966 | Cederberg | 226/176 X |

*Primary Examiner*—Richard A. Schacher
*Attorney*—Arthur V. Smith

[57] ABSTRACT

A pressure roll assembly for tape recording and playback equipment to apply a uniform pressure to a pressure roller or pinch roller against a tape drive capstan in order to insure a uniformly constant tape motion for playback and recording. The pinch roller is rotatably mounted on a roller support arm which is pivotably secured intermediate its ends within the recording apparatus and the pinch roller support arm is pivoted into engagement with a tape drive capstan by a crank pin assembly driven by a motor driven worm gear member thereby to pinch the magnetic tape therebetween.

14 Claims, 7 Drawing Figures

PRESSURE ROLL ASSEMBLY FOR TAPE RECORDING AND PLAYBACK EQUIPMENT

The present invention relates to a tape drive mechanism adapted for use in a magnetic tape recording and playback apparatus and more particularly relates to an apparatus to provide constant and uniform pressure between the rotatable pinch roll and a driven tape capstan member to insure the application of uniform pressure on the magnetic tape pressed between the pinch roll and capstan.

In magnetic tape recording and playback equipment commonly termed "professional" recording equipment utilized by recording companies to make master tapes and in the broadcast industry, it is imperative in order to achieve high quality reproduction that magnetic tape transport through the recording and playback apparatus be carefully controlled to insure precise alignment and transport of the tape past the playback and recording heads. Consequently, professional type recording and playback apparatus are carefully and painstakingly designed to provide precision alignment and transport of the magnetic tape past the recording and/or playback heads. Of special concern in design of such equipment is to make certain that the velocity of the tape past the playback and/or recording heads is maintained at a constant and uniform rate to minimize deleterious effects due to "wow" and "flutter."

In such professional magnetic tape recording and playback equipment the magnetic tape, which may range from a quarter inch width up to two inches in width, is unwound from one reel past the recording and/or playback heads and wound onto a second reel. The reel from which the tape is being unwound is usually freely rotatable and the takeup reel is driven and in addition the tape is driven by a rotating capstan against which the tape is pressed by a rotatable pinch wheel member. The capstan and pinch wheel combination are commonly employed to assist in tape drive only during the record and playback sequence and is disengaged when the tape is wound from one reel to another reel in fast forward or fast reverse play positions.

Since the critical period of operation for apparatus of this type is during the play and/or record mode, it is essential that the tape velocity past the record and playback heads be maintained at a uniform predetermined velocity, i.e. 3 ¾, 7 ½, 15 or 30 inches per second. Since the pinch wheel member presses the magnetic tape against the rotating capstan, which is rotating at an appropriate speed to transport the tape at the desired velocity, it is essential that the pressure pressing the pinch wheel member against the drive capstan be maintained as uniformly as possible to maintain the velocity of tape transport at the desired uniform rate. Variations in the pressure of the pinch wheel member against the drive capstan will result in variations of the tape velocity which will have deleterious effects on the quality of the recording and/or playback.

Prior art devices used in tape recording and playback equipment of this general type employ a spring loaded pressure roller assembly activated by a solenoid. The final position of the pressure roller when it is engaged against the tape drive capstan is a spring loaded position with a predetermined load dictated by the spring characteristics. The spring acts against an actuator rod coupled to a solenoid. In some instances, as the solenoid is heated by continuous operation, its pulling force is reduced due to increased resistance of the solenoid coil so that a variation in the spring force holding the pressure roller against the drive capstan results.

Additionally, when the solenoid powered pressure roller is engaged against the drive capstan the pressure roller is forced against the capstan with a sudden impact which tends to brinnel the top bearing of the capstan motor after a period of time to introduce unevenness in the capstan drive which deleteriously affects tape transport.

Accordingly, it is an object of the present invention to provide a device for use in a magnetic tape recording and playback unit to provide a continuously uniform pressure between a tape drive capstan and a rotatable pressure roller member.

It is a further object of the present invention to provide a pressure roller assembly to cooperate with a tape drive capstan in a magnetic tape playback and recording apparatus which can be rapidly and conveniently engaged and disengaged from operable tape drive association with a capstan.

It is a still further object of the present invention to provide a pressure roller assembly cooperable with a drive capstan in a magnetic tape recording and playback unit which moves the pressure roller into operable engagement against the tape drive capstan without sudden impact.

It is also an object of the present invention to provide a pressure roller assembly to move a pressure roller into engagement with a tape drive capstan where the pressure roller is moved initially at high speed and low torque and at engagement is moved with low speed and high torque.

In accordance with a preferred embodiment of the present invention, a pressure roller such as a pinch roller is rotatably mounted on one end of an actuating arm which is pivotably secured at a mid-portion thereof to the chassis of the magnetic tape recording and playback apparatus. The other end of the actuating arm is secured to one end of a crank-driven connecting rod which is secured at its other end to a rotatable gear segment driven by a worm gear and motor. Rotation of the worm gear rotates the gear segment and connecting rod to pivot the actuating arm thereby pivoting the pinch roller into engagement with a tape drive capstan.

Figure 1:
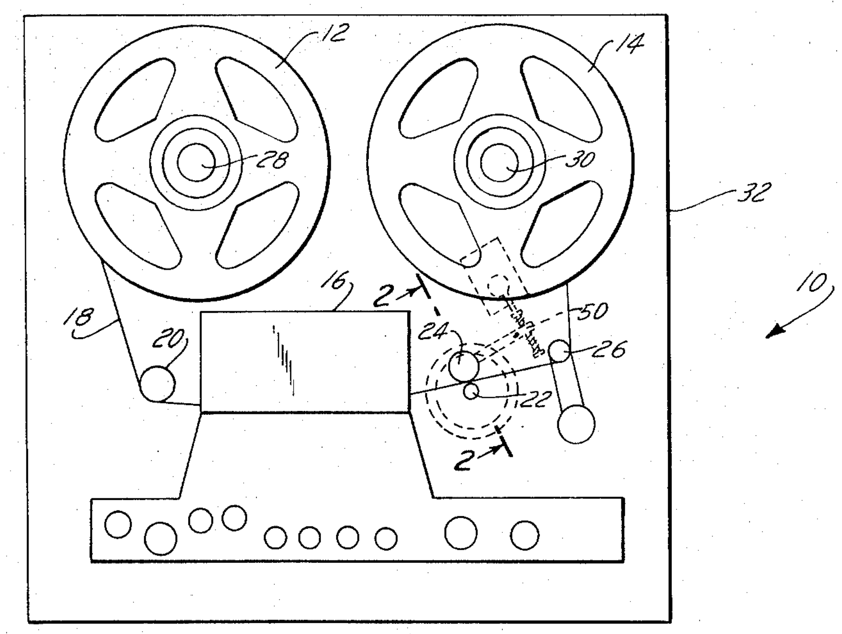
FIG. 1 is a diagrammatic representation of a magnetic tape recording and playback apparatus showing the orientation of the pinch roller assembly of the present invention.
Figure 2:
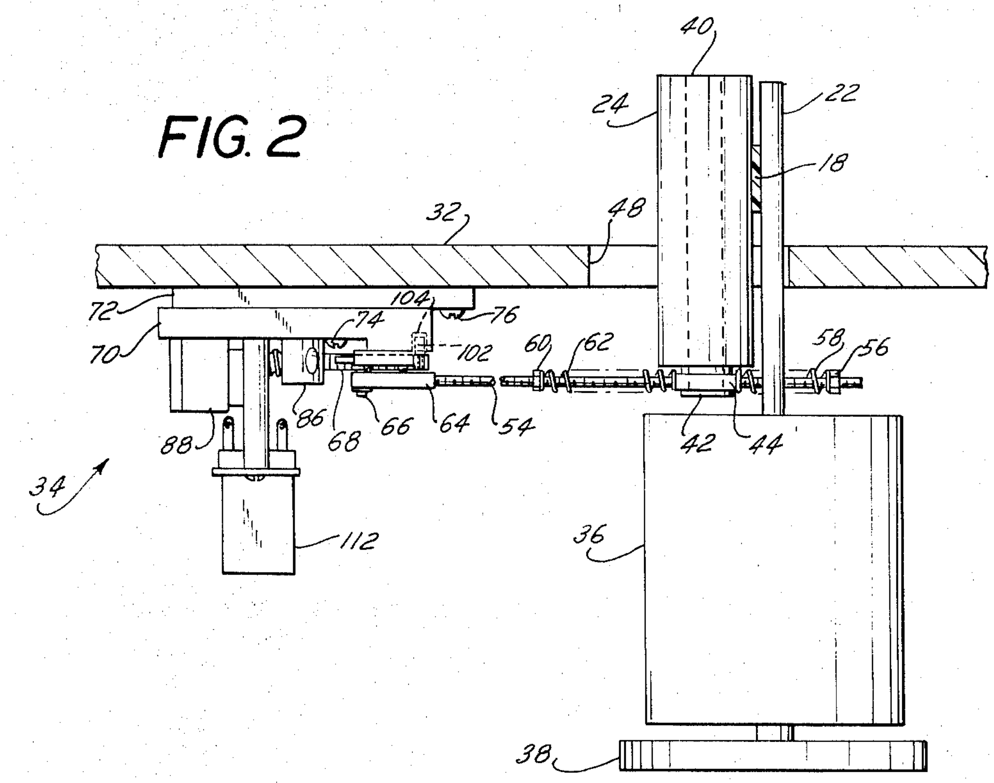
FIG. 2 is a vertical sectional view taken on line 2—2 of FIG. 1.

With reference to the drawings and particularly FIGS. 1 and 2, a magnetic tape recording and playback apparatus 10 is shown which includes a magnetic tape supply reel 12, a takeup reel 14 and a housing 16 enclosing recording and playback heads (not shown). Magnetic tape 18 is unwound from the supply reel 12 around an idler roll 20 through the housing 16 past the recording and playback heads and then threaded between a drive capstan 22 and a pressure or pinch roller 24 and around an idler roll 26 to the takeup reel 14. Both the tape supply reel 12 and the takeup reel 14 are suitably mounted on hub members 28 and 30, respectively, extending above a chassis plate 32 and in the play or record mode takeup reel 14 is driven, pinch roll 24 presses the tape 18 against the drive capstan 22, which is also driven, and the tape is drawn from the supply reel 12 past the recording and playback heads in housing 16.

To obtain the highest degree of fidelity in recording and reproducing sound on magnetic tape it is of course necessary to use high quality electronic components and to utilize mechanical components for the tape transport to insure proper alignment and tracking of the tape through the recording and playback sequence and also to insure that tape velocity remains at a uniformly constant rate throughout the playback and recording sequence. The present invention assists in achieving the desired result of achieving a uniform tape transport velocity by providing a motor driven pressure roller assembly 34 (see FIG. 2) operatively associated with the pressure roll 24 to insure that a uniformly constant pressure is applied to the tape 18 to force it against a rotating drive capstan 22. Thus in its operative condition, during recording and/or playback, the pinch roll 24 presses tape 18 against drive capstan 22 with a uniformly constant pressure in order to assure that the tape velocity past the playback and/or recording heads is uniform to minimize wow and flutter.

The tape drive capstan 22 is conventionally driven by a capstan motor 36 and is provided with a flywheel 38 to insure uniform speed of rotation of the capstan 22.

With reference now to FIGS. 3 through 6 as well, the pinch roller 24 is mounted about a spindle 40 rotatably secured as at 42 to one end 44 of a pressure roller actuator arm 46. The pressure roller actuator arm 46 and the capstan motor 36 are positioned below the plate 32 with the pressure roller and capstan extending up through the plate 32 within an access slot 48 therein. Pressure roller actuator arm 46 is pivotably secured as at 50 to the underside of the plate 32 and its other end 52 is provided with an opening therein through which is disposed a connecting rod member 54.

Connecting rod member 54 is preferably a threaded shaft member and is provided with a nut 56 threadably engaged on one end of connecting rod 54 which serves as an abutment for a compression spring member 58 disposed about connecting rod 54. Spring 58 serves to provide the clamping pressure force of the pressure roller against the capstan. One end of spring 58 abuts the nut 56 and the other end of spring 58 abuts against end 52 of actuator arm 46. A nut member 60 is also threadably engaged on connecting rod 54 intermediate its ends and serves as an abutment for one end of a compression spring 62 disposed about the connecting rod 54 with the other end of spring 62 abutting against end 52 of actuator arm 46 diametrically opposite to the abutment of spring 58. Spring 62 acts as a return spring and has a lesser spring force than spring 58 and serves to return end 52 of actuator arm 46 into abutting contact with the clamping pressure spring 58.

The other end of connecting rod 54 is threadably engaged with a link member 64 which is pivotably secured to a crank pin 66. The crank pin 66 is fixed within a gear segment 68 with the crank pin 66 extending above the face of gear segment 68 and being radially offset from the longitudinal axis of gear segment 68. Gear segment 68 is rotatably mounted to a mounting block 70 which is in turn fixed to a mounting plate 72 by screws 74 with the mounting plate 72 being secured to the underside of plate 32 by screws 76.

Gear segment 68 is provided with gear teeth 78 about a substantial portion of the perimeter of the gear segment and is foreshortened as at 80 and 82 (see FIG. 5 in particular) for a purpose to be described more fully hereinbelow. The gear teeth 78 are adapted to mesh with a worm gear member 84 rotatably journaled at one end within a bracket post 86 and fixed to a d.c. motor 88 at its other end with both the motor 88 and the bracket post 86 being fixed to the mounting block 70. Motor 88 drives the worm gear 84 to rotate the gear segment 68 about its pivotal mounting.

Figure 3:
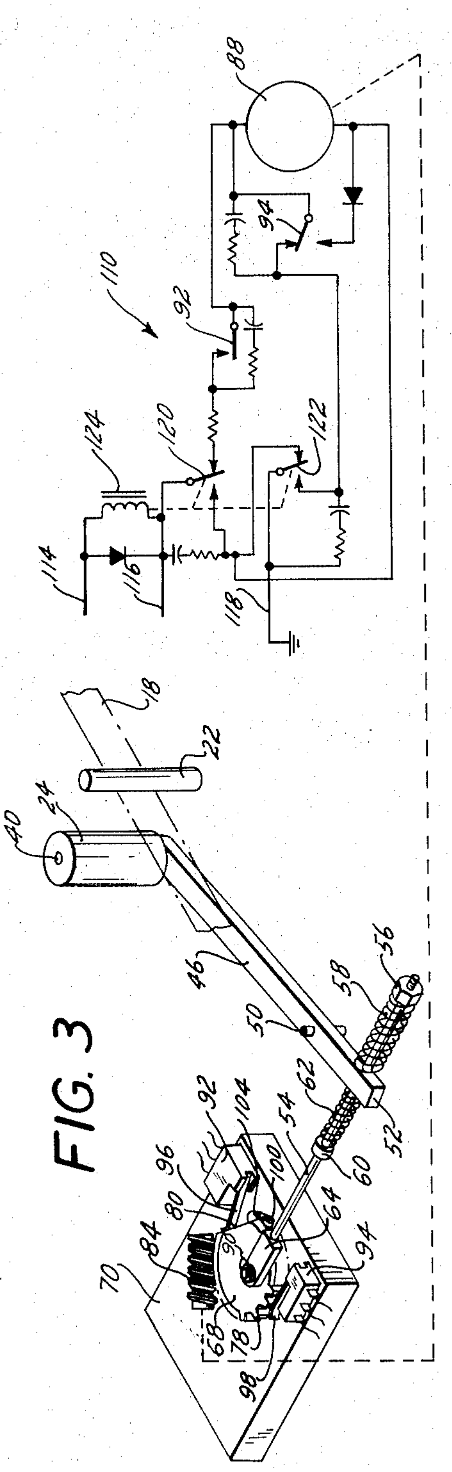
FIGS. 3, 4, 5 and 6 are perspective views showing the position of the pinch roller assembly during various sequences of operation as well as a schematic diagram of the control circuitry.
Figure 4:
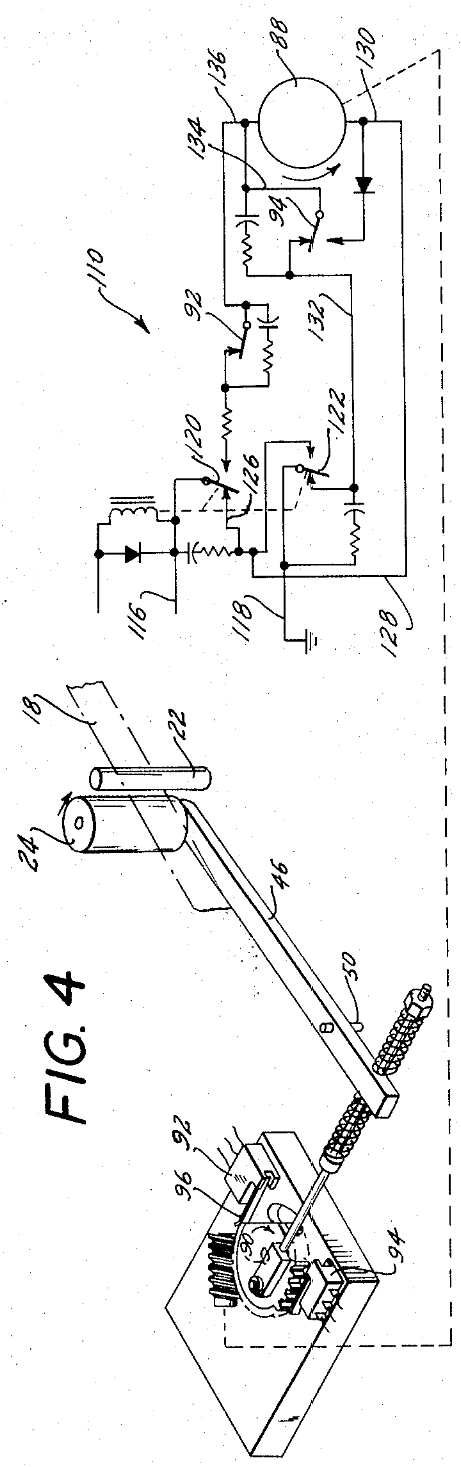
Figure 5:
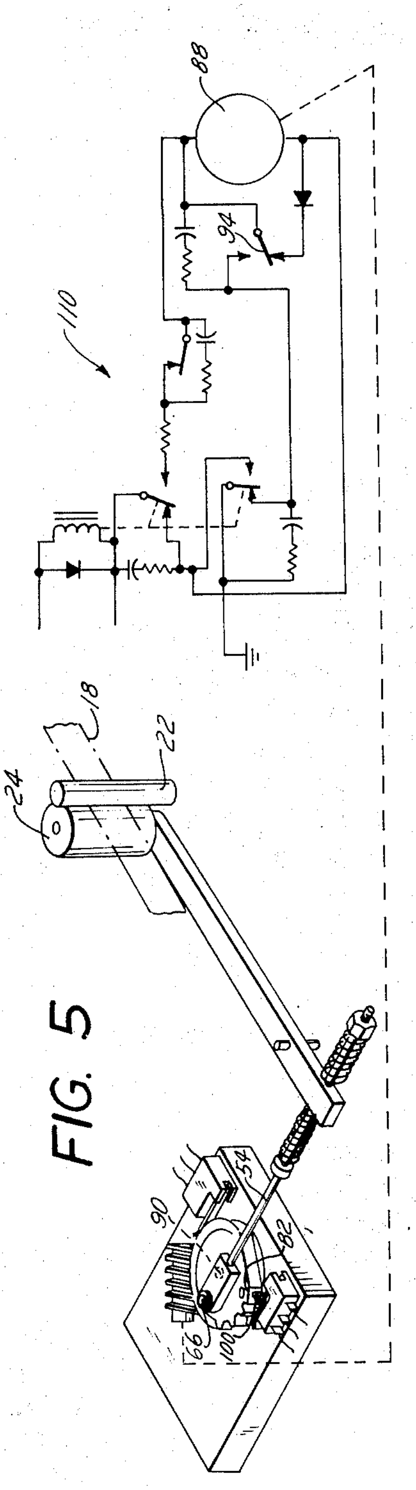
Figure 6:
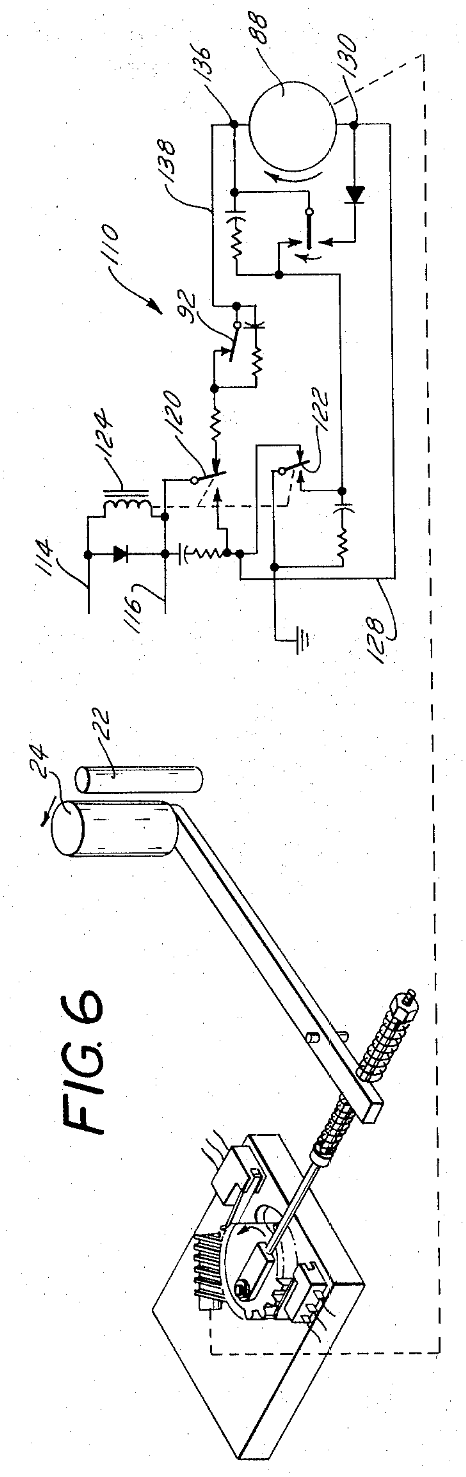

With particular reference to FIGS. 3 to 5 where a sequence of operation is shown starting from a disengaged position of the pressure roller 24 in FIG. 3, the movement of the pressure roller 24 toward capstan 22 in FIG. 4, the engaged position of the pressure roller 24 against the capstan 22 with tape 18 pressed therebetween in FIG. 5 and the movement of the pressure roller 24 away from capstan 22 toward the disengaged position in FIG. 6, it is seen that motor 88 rotates worm gear 84 to cause gear segment 68 to rotate about its pivotal mounting 90 to pivot crank pin 66 from the position shown in FIG. 3 to the position shown in FIG. 5. In this position the axes of the crank pin 66 and gear segment 68 lie in the same plane passing through the longitudinal axis of connecting rod 54. Thus connecting rod 54 is positioned over the axis 90 of the gear segment 68 in the "home" position when pinch roller 24 is firmly clamped against capstan 22.

Fixed to each side of mounting block 70 are an "off" limit microswitch 92 and an "on" limit microswitch 94. Microswitch 92 is provided with an actuating spring arm 96 which contacts the perimeter of gear segment 68 with the actuating spring 96 being maintained in a depressed inward position when in contact with the geared portion 78 but which springs outwardly when gear segment 68 is rotated so that actuating arm 96 is in contact with the flat 80 of the gear segment. Microswitch 94 includes an actuating spring arm 98 positioned so that it is clear of the geared portion 78 of gear segment 68 and spring biased away from the contact element of the microswitch 94 but which is depressed inwardly by an adjustable screw stop 100 mounted within the flat 82 of gear segment 68 to close the contact member. Thus in the position shown in FIG. 3 the contact element of microswitch 92 is open and the contact element of microswitch 94 is open. In the position shown in FIG. 4 the contact element of microswitch 92 is closed as gear segment 68 rotates to move spring arm 96 inwardly toward microswitch 92 while the contact element of microswitch 94 remains open because it clears the perimeter of the geared portion 78 of gear segment 68. In the position shown in FIG. 5 adjustment screw 100 has now been rotated into contact with the spring arm 98 of microswitch 94 and the contact element of microswitch 94 is closed. When gear segment 68 is rotated in the opposite direction, i.e. to the position shown in FIG. 6, the contact element of microswitch 94 opens while the contact element of microswitch 92 remains closed until gear segment 68 is rotated back to the position shown in FIG. 3.

While the microswitches 92 and 94 electrically control and limit the degree of rotation of gear segment 68, a mechanical backup which limits the extent of rotation of gear segment 68 is also provided to limit the rotation of gear segment 68 in the event that either one of the microswitches malfunctions. Thus gear segment 68 is provided with dowel 102, or the like, extending from the gear segment surface closest to mounting block 70 and the mounting block 70 includes an arcuate groove 104 therein to cooperate with the extending dowel 102 to limit the degree of rotation of gear segment 68.

The rotation of worm gear 84 is controlled by motor 88 responsive to the operating characteristics of a motor control circuit shown generally at 110 in FIGS. 3 through 6. Circuit 110 is controlled responsive to the selected play mode of the recording and playback apparatus as dictated by a transport logic circuit module (not shown). The logic circuit controls a contact 114 in circuit 110 and maintains contact 114 in an open position in any mode of the apparatus except record or playback, as will be explained more fully hereinbelow.

Circuit 110 is connected to a d.c. energy source across leads 116 and 118 but for the condition shown in FIG. 3, where pinch roller 24 is not in operative engagement with the capstan 22, an open circuit condition exits to the motor 88 due to the position of relays 120 and 122. For the condition shown in FIG. 3 the "off" limit microswitch 92 and the "on" limit microswitch 94 are in their unoperated position as the position of the gear segment 68 allows the spring arm members 96 and 98, respectively, to remain in an outward position so that the contact elements of both microswitches are extended.

When any operating mode for the apparatus is initiated, the logic circuit closes contact 114 impressing a voltage across relay coil 124 to close relays 120 and 122 to the position shown in the circuit diagram in FIG. 4. The relay coil 124 and relays 120 and 122 are housed in a module 112 (see FIG. 2). FIG. 4 depicts the apparatus of the present invention in a transitory state from the non-operative position of FIG. 3 to the fully operative position of FIG. 5. Relays 120 and 122 now close a circuit to motor 88 so that motor 88 is powered to rotate in the direction indicated in FIG. 4. As soon as motor 88 is actuated, worm gear 84 rotates to cause gear segment 68 to rotate and, as shown in FIG. 4, as soon as the gear tooth portion 78 of gear segment 68 rotates to contact spring arm 96 of "off" limit microswitch 92, the spring arm is depressed closing the contact element of limit switch 92 as shown in the circuit diagram of FIG. 4. Thus a positive voltage path is closed to motor 88 from lead 116 through relay 120, lead 126 and lead 128 to terminal 130 of motor 88. A grounding path is also closed to motor 88 from lead 118 through relay 122, lead 132 "off" limit microswitch 94 and lead 134 to terminal 136 of motor 88.

As the gear segment is rotated through the position shown in FIG. 4, the connecting rod 54 is withdrawn thus pivoting actuating arm 46 so that pinch roller 24 moves toward the capstan 22. The pinch roller begins to move toward the capstan rapidly with low initial torque but near the completion of the stroke, which ends when the crank pin 66 and connecting rod 54 are axially aligned over the gear segment pivot axis 90, the pinch roller movement is slowed because of the reduction in the motion at the crank pin (as will be explained more fully hereinafter) while the compression of the spring is increased to provide more torque in the actuator arm 46 to firmly press the pinch roller 24 against capstan 22.

Referring now to FIG. 5, the "home" position of the pinch roller 24 against the capstan 22 is shown as well as the circuit condition of circuit 110. Just prior to the pinch roller reaching the "home" position the adjustable screw stop 100 mounted within flat 82 of gear segment 68 contacts spring arm 98 of the "on" limit microswitch 94 and moves the switch 94 from the position shown in FIGS. 3 and 4 to the position shown in FIG. 5. The operation of the "on" limit microswitch 94 opens the grounding path to motor 88 and short circuits the motor. In this condition, the motor momentarily behaves as a generator to dynamically brake the rotation of the gear segment as the crank pin 66 enters its "home" position. In the "home" position, the connecting rod 54 is unable to move to either side assuring constant pressure from the pressure spring 58 to maintain the pinch roller 24 in contact with capstan 22. In the "home" position, the circuit to motor 88 remains open so that the motor does not operate and the pinch roller 24 remains in contact against capstan 22 until the circuit is activated to retract the pinch roller from its contact position against the capstan.

When the apparatus is switched from an operating mode such as record or play to either standby or a fast tape-motion mode, the logic circuit de-energizes contact 114 thus de-energizing relay coil 124 so that relays 120 and 122 return to their original positions. This circuit situation is shown in FIG. 6. The circuit situation of FIG. 6 differs from the circuit situation in FIG. 3 in that microswitches 92 and 94 are in positions opposite to the positions of the FIG. 3 circuit situation. This condition results in the application of a reversed polarity to the motor 88 so that a positive voltage path from lead 116, relay 120, microswitch 92 and lead 138 is provided to terminal 136 of motor 88. This differs from the circuit path shown in FIG. 4 where terminal 136 is connected to the ground path. A ground path from lead 118, through relay 122 and lead 128 to terminal 130 of motor 88 is also opposite to the condition shown in FIG. 4. The motor therefore drives worm gear 84 in the opposite direction to drive gear segment 68 so that the crank pin 66 and actuator arm 46 are returned to the condition which pinch roller 24 is moved away from capstan 22.

Figure 7:
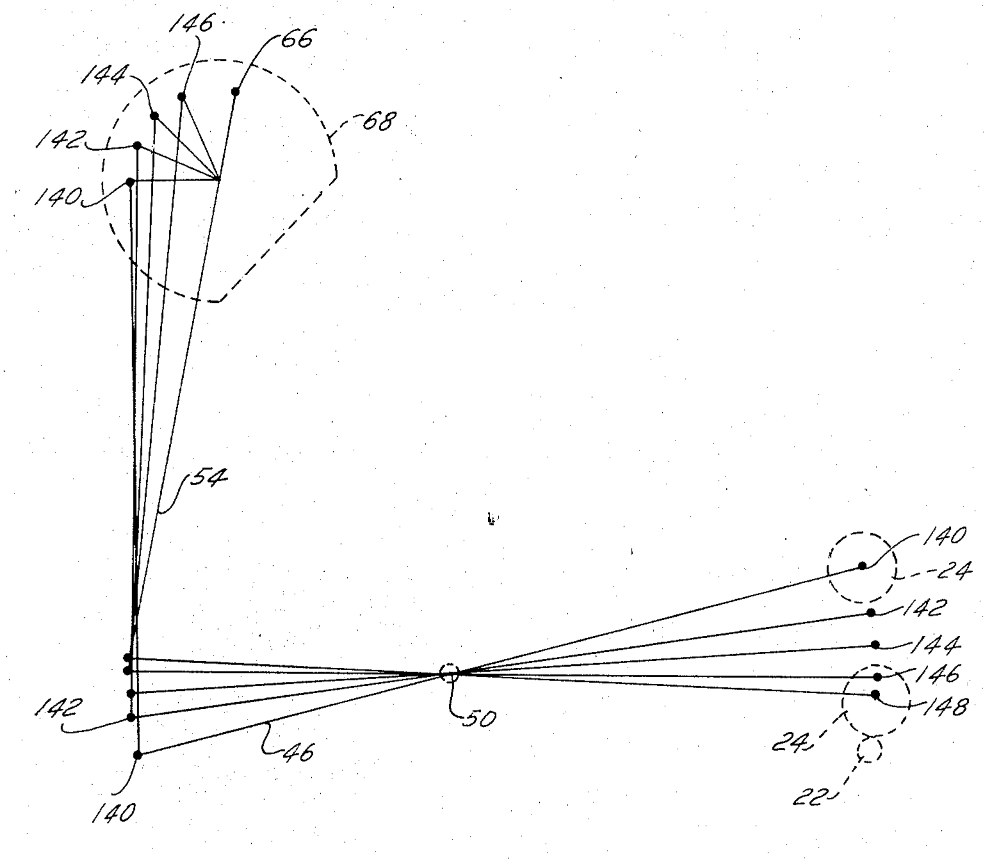
FIG. 7 is a diagrammatic representation of the positions of the mechanical elements in the pinch roller assembly of the present invention.

Referring to FIG. 7, there is shown diagrammatically the positions of the pinch roller 24 and actuating arm 46, the crank pin 66 on gear segment 68 and the connecting rod 54 during movement from a disengaged position to an engaged position. In the position indicated at 140, corresponding to the fully disengaged position of the pinch roller 24, the crank pin 66 and connecting rod 54 are shown to be laterally offset from the pivotal axis 90 of gear segment 68. As gear segment 68 is rotated by worm gear 84, crank pin 66 rotates to the position indicated at 142 drawing connecting rod 54 upwardly as viewed in FIG. 7 to pivot actuating arm 46 and pinch roller 24 as indicated by position 142.

Continued rotation of gear segment 68 pivots crank pin 66, connecting rod 54, actuating arm 46 and pinch roller 24 to positions 144, 146 and 148, respectively, with position 148 corresponding to the "home" position for pinch roller 24 against capstan 22. In position 148, connecting rod 54 is positioned directly over the pivotal axis 90 for gear segment 68 to essentially lock the pinch roller 24 in its engaged position against capstan 22.

Because of the specific orientation of crank pin 66 and connecting rod 54, the arcuate rotation of the crank pin as gear segment 68 rotates results in a larger initial displacement for pinch roller 24 diminishing to a relatively small displacement for the same arcuate displacement of crank pin 66. As seen in FIG. 7, the displacement between positions 140 through 148 for the pinch roller 24 progressively decreases between each indicated position while the arcuate displacement for crank pin 66 along its arcuate path is equal between positions 140 through 148.

This results because the mechanical advantage of the crank pin 66 driving connecting rod 54 is proportional to the sine of the angle of crank pin rotation. Inasmuch as the crank pin 66 is rotated essentially at a uniform rate the initial movement of pinch roller 24 is at high speed with low torque prior to capstan contact and at low speed with high torque at capstan contact. Thus the impact of the pinch roller on the capstan is substantially reduced.

Additionally, as pointed out above, adjustment screw 100 actuates "on" limit microswitch 94 just prior to capstan 24 reaching the "home" position in engagement with capstan 22. This shorts the circuit to motor 88 so that the motor acts as a dynamic brake to further minimize the impact of the pinch roller against the capstan.

Thus the present invention provides a pressure roller assembly for tape recording and playback equipment which moves a pinch roller against a tape drive capstan and maintains the pinch roller in engagement with the capstan so that a uniformly constant pressure is applied to the magnetic tape between the drive capstan and the pinch roller. The pinch roller is moved into engagement with the capstan initially at high speed and low torque but as the pinch roller contacts the capstan the pinch roller is moving at lower speed and higher torque to insure a smooth engagement without high impact forces.

What is claimed is:

1. Apparatus to move a pressure member into engagement with a fixed abutment and to maintain a uniformly constant pressure between said pressure member and said abutment comprising,
   an actuator arm member pivotably mounted at a midportion thereof,
   said pressure member being fixed to one end of said actuator arm member,
   one end of a connecting rod fixed within the other end of said actuator arm member,
   the other end of said connecting rod operably associated with means to rotate said other end of said connecting rod through an arcuate path comprising a rotatable member including a crank pin extending therefrom radially offset from the axis of rotation of said rotatable member,
   said other end of said connecting rod being pivotably secured to said crank pin whereby rotation of said rotatable member rotates said crank pin and said other end of said connecting rod in an arcuate path to pivot said actuator arm about said pivotable mounting thereby to pivot said pressure member into contact with said abutment.

2. Apparatus as defined in claim 1 wherein said rotatable member comprises a gear segment having gear teeth around a substantial portion of the periphery, a worm gear member operatively engaged with the geared portion of said rotatable member and means to rotate said worm gear member thereby to rotate said rotatable member.

3. Apparatus as defined in claim 2 including means operatively associated with said rotatable member to limit the extent of rotation of said rotatable member between a first position wherein said pressure member is spaced from said abutment to a second position wherein said pressure member is pressed against said abutment.

4. A pressure roll assembly for use in magnetic tape recording and playback apparatus having a tape drive capstan to drive the magnetic tape past recording and playback heads comprising,
   a rotatable pressure roll adapted to engage said capstan to press said magnetic tape against said capstan,
   said pressure roll being rotatably mounted on one end of an actuator arm,
   said actuator arm being pivotably mounted at a midportion thereof within said recording and playback apparatus,
   the other end of said actuator arm being operatively engaged on a connecting rod member, operably
   one end of said connecting rod member being secured to a rotatable member radially offset from the axis of rotation of said rotatable member,
   means to rotate said rotatable member to effect a pivoting action of said end of said connecting rod about said axis of rotation thereby to move said connecting rod to effect pivoting movement of said actuator arm and said pressure roll into engagement with said capstan,
   spaced to limit the extent of rotation of said rotatable member between a first position wherein said pressure roll is apced from said capstan and a second position wherein said pressure roll is engaged against said capstan,
   said connecting rod being oriented when said rotatable member is in said first position such that a plane passing through the longitudinal axis of the connecting rod is offset from the axis of rotation of said rotatable member and said connecting rod being oriented when said rotatable member is in said second position such that a plane passing through the longitudinal axis of said connecting rod passes through the axis of rotation of said rotatable member thereby locking said pressure roll against said capstan.

5. Apparatus as defined in claim 4 wherein said rotatable member comprises a gear segment having gear teeth about a substantial portion of the periphery of said gear segment and said one end of said connecting rod is pivotably secured to a pin member extending from the surface of said gear segment.

6. Apparatus as defined in claim 5 wherein said means to rotate said gear segment includes a worm gear member operatively engaged with said gear teeth and said worm gear member is adapted to be driven by a motor.

7. Apparatus as defined in claim 6 wherein said motor is a d.c. motor and means to limit the extent of rotation of said gear segment includes at least a pair of microswitch members operatively connected with an electrical circuit to said motor each said microswitch including contact arms to actuate the switch responsive to the sensed rotation of said gear segment between said first position and said second position thereby to control the operation of said motor.

8. Apparatus as defined in claim 7 wherein one of said microswitch members is actuated during rotation of said gear segment immediately prior to said gear segment reaching said second position thereby to effect a short circuit condition in said electrical circuit to said motor whereby said motor acts as a dynamic brake to slow the rotation of said gear segment and minimize the impact of said pressure roll against said capstan.

9. Apparatus to move a pressure member into engagement with a fixed abutment and to maintain a uniformly constant pressure between said pressure member and said abutment comprising, a rod-like actuator arm member pivotably mounted at a mid-portion thereof, said pressure member being fixed to one end of said actuator arm member, a connecting rod having one end fixed through the other end of said actuator arm member, the other end of said connecting rod operably associated with means to rotate said other end of said connecting rod through an arcuate path whereby said actuator arm is pivoted about said pivotal mounting thereby to pivot said pressure member into contact with said abutment.

10. Apparatus as defined in claim 9 wherein said means to rotate said other end of said connecting rod through an arcuate path comprises a rotatable member including a crank pin extending therefrom radially offset from the axis of rotation of said rotatable member, said other end of said connecting rod being pivotably secured to said crank pin whereby rotation of said rotatable member rotates said crank pin and said other end of said connecting rod in an arcuate path.

11. A pressure roll assembly for use in magnetic tape recording and playback apparatus having a tape drive capstan to drive the magnetic tape past recording and playback heads comprising, a rotatable pressure roll adapted to engage said capstan to press said magnetic tape against said capstan, said pressure roll being rotatably mounted on one end of a rod-like actuator arm, said actuator arm being pivotably mounted at a mid-portion thereof within said recording and playback apparatus, a connecting rod member having one end fixed through the other end of said actuator arm, the other end of said connecting rod member being secured to a rotatable member radially offset from the axis of rotation of said rotatable member, means to rotate said rotatable member to effect a pivoting action of said end of said connecting rod about said axis of rotation thereby to move said connecting rod to effect pivoting movement of said actuator arm and said pressure roll into engagement with said capstan.

12. Apparatus as defined in claim 11 including means to limit the extent of rotation of said rotatable member between a first position wherein said pressure roll is spaced from said capstan and a second position wherein said pressure roll is engaged against said capstan.

13. Apparatus as defined in claim 12 wherein when said rotatable member is in said first position said connecting rod is oriented such that a plane passing through the longitudinal axis of the connecting rod is offset from the axis of rotation of said rotatable member and when said rotatable member is in said second position a plane passing through the longitudinal axis of said connecting rod passes through the axis of rotation of said rotatable member thereby locking said pressure roll against said capstan.

14. Apparatus as defined in claim 11 wherein the other end of said actuator arm is slidably disposed along said connecting rod, said connecting rod being provided with resilient means between its other end and the other end of said actuator arm to resiliently urge said pressure roll against said capstan when said pressure roll is engaged against said capstan.

* * * * *

UNITED STATES PATENT OFFICE

CERTIFICATE OF CORRECTION

Patent No. 3,764,052 Dated October 9, 1973

Inventor(s) Lawrence J. Scully

It is certified that error appears in the above-identified patent and that said Letters Patent are hereby corrected as shown below:

In the Claims:

Column 8, line 26, delete "operably"
Column 8, line 36, delete "spaced" and insert therefor --means--
Column 8, line 38, delete "apced" and insert therefor --spaced--.

Signed and sealed this 19th day of February 1974.

(SEAL)
Attest:

EDWARD M.FLETCHER,JR.
Attesting Officer

C. MARSHALL DANN
Commissioner of Patents